March 1, 1932.   W. L. KLUG   1,847,565
WASHABLE ELECTRIC COFFEE PERCOLATOR
Filed Oct. 21, 1929
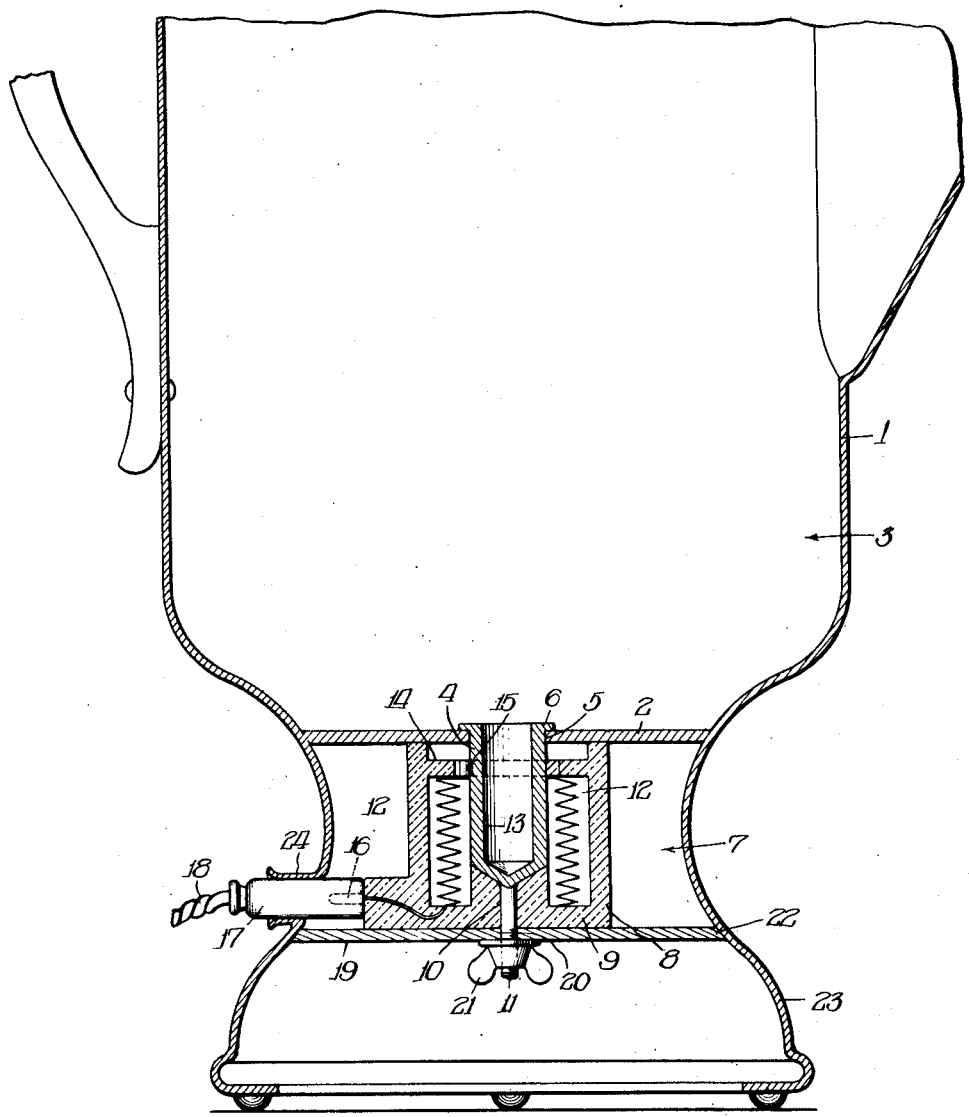
Inventor:
William L. Klug,
By Cheever, Cox & Moore
Attys.

Patented Mar. 1, 1932

1,847,565

UNITED STATES PATENT OFFICE

WILLIAM L. KLUG, OF CHICAGO, ILLINOIS

WASHABLE ELECTRIC COFFEE PERCOLATOR

Application filed October 21, 1929. Serial No. 401,046.

This invention relates to percolators.

Percolators of the conventional type are not readily washable as they could not be bodily inserted in a dish pan or placed under a water faucet to be thoroughly washed, as the water would seep through the heating unit and cause a short circuit of the heating coils. Another reason that the ordinary type of percolator cannot be washed is, the connections are so loose that water would readily leak into the various parts and quickly deteriorate the heating coils or elements, as well as cause rusting at the various joints where the heating unit is connected to the percolator casing.

The primary object of the present invention is to provide a new and improved percolator which can be readily washed.

Another object is to provide a percolator or other electrically heated device which has a removable heating unit.

A further object is to provide a percolator or the like, which has an electrical heating unit supported within the casing of the percolator by a single nut, the electrical connection to the heating unit being made within the periphery of the percolator, with the socket extending through the casing to permit instant removal of the heating unit when the socket is detached.

Numerous other objects and advantages will be apparent throughout the progress of the specification.

The invention comprises in general a percolator having an outer casing and a bottom member. A vaporizing chamber is rigidly connected to the bottom member and extends downwardly therefrom. A heating unit is arranged in the bottom of the casing and is supported in position by means of a wing nut threadedly engaging the stem of an extension member on the vaporizing chamber. A pair of prongs are electrically connected to the resistance coils in the heating unit, and these prongs or contacts extend wholly within the periphery of the percolator casing. The usual socket is operatively connected to a source of electrical supply and extends through the casing and makes contact with the prongs on the resistance coils.

The accompanying drawing illustrates a selected embodiment of the invention, and the view shown therein is a detail vertical sectional view of the improved percolator and associated parts.

Referring to the drawing, 1 designates a casing having a bottom member 2 to form the receptacle or chamber 3. A downwardly extending vaporizing chamber 4 extends through an opening 5 formed in the bottom of the member 2. This chamber may be made circular and be provided with an annular flange 6, which is rigidly connected to the member 2. Or, this member may be made integral with the member 2, just so that a water tight connection is provided between the member 2 and the chamber 4.

The casing extends below the member 2 a substantial distance to provide a chamber 7 in which a heating unit 8 is arranged. The heating unit is provided with a body part 9 to which a stem 11 is fastened or carried in any convenient manner. The usual resistance coils or heating elements 12 are arranged in the heating unit in any well known manner and have heating contact with the walls 13 of the small liquid or vaporizing chamber 4. A supporting ring 14 is provided with arms 15 which engage the liquid or vaporizing chamber 4 to hold the parts in rigid assembled position. The resistance coils 12 are operatively connected to a plug 16 having the usual contacts, the plug extending within the walls of the casing.

A socket 17 is operatively connected to conductors 18 which lead to a source of electrical supply and provide current to the resistance coils 12.

A bottom plate 19 is provided with an aperture 20, through which the stem end 11 projects. A single fastening member such as a wing nut 21 has threaded engagement with the stem 11 for holding the plate and heating unit in detachable position. The plate 19 makes a substantial tight connection with the casing at 22 and is preferably made integral with the heating unit 8. The bottom of the heating unit, including the plate 19, extends a short distance above the bottom of the casing to provide an annular support for the percolator.

To wash the percolator the socket 17 is pulled out and the wing nut 21 removed from the stem end 11. The entire heating unit including the plate 19 can then be removed from the chamber 7, as all the parts of the heating unit including the plug are arranged within the casing. The percolator can then be bodily inserted in a dish pan or it can be washed under a faucet. After the percolator has been thoroughly washed and dried, the heating unit can be instantly replaced by inserting it in place around the vaporizing chamber 4, the wing nut 21 being secured in position to clamp the heating unit in position. When the socket 17 is inserted through the casing to make contact with the plug 16, the percolator is again in operation. The resistance coils which supply the heat for the percolator are arranged in close proximity to the vaporizing or liquid chamber and causes quick heating of the liquid in the chamber 4 to permit instant percolation of some of the liquid contents in the chamber 3.

The lugs or supports 24 may be provided about the opening where the socket 17 extends through the casing, so that the electrical connection can be quickly made, and it will not be necessary to feel for the prongs of the plug 16.

The invention provides a coffee percolator or other like receptacle having a heating unit which can be easily detached from the percolator to permit the percolator to be readily washed. By having the plug extending into the casing to make the electrical connection instead of having the prongs extending outwardly of the casing, the entire unit may be quickly and readily removed by merely removing the wing nut 21. The downwardly extending vaporizing or liquid chamber permits the contents of the percolator to be quickly heated and causes rapid percolation. The detachability of the heating unit by disengagement of the nut from the stem permits quick detachment and replacement of the heating coils not only for the purposes previously set forth herein but also to permit new coils to be quickly replaced or the old coils readily repaired.

Changes may be made in the form, construction and arrangement of the parts without departing from the spirit of the invention or sacrificing any of the advantages thereof, and the right is hereby reserved to make all such changes as fairly fall within the scope of the following claims.

The invention is hereby claimed as follows:

1. A washable electric coffee percolator comprising an enclosed casing, a bottom for said percolator located a predetermined distance above the bottom edge of the casing, an elongated tubular liquid chamber connected to said bottom for receiving a small amount of liquid, an electric heating element, coils carried by said heating element and arranged in close proximity to a wall of the liquid chamber, a stem connected to a part of said liquid chamber, and a single hand operated fastening member threadedly engaging said stem for holding the heating unit in place relative to the vaporizing chamber, whereby removal of said single fastening member permits instant detachability of said heating unit permitting the percolator minus its heating unit to be washed.

2. A washable electric coffee percolator comprising an enclosed casing, a bottom for said percolator located a predetermined distance above the bottom edge of the casing, an elongated tubular liquid chamber connected to said bottom for receiving a small amount of liquid, an electric heating element, coils carried by said heating element and arranged in close proximity to a wall of the liquid chamber, a stem connected to a part of said liquid chamber, a single hand operated fastening member threadedly engaging said stem for holding the heating unit in place relative to the vaporizing chamber whereby removal of said single fastening member permits instant detachability of said heating unit permitting the percolator minus its heating unit to be washed, electric contacts carried by said heating element and arranged inside of the casing, said casing having a single opening through one side thereof, and an electric connector extending through said opening and electrically connected with said contacts.

3. A washable electric coffee percolator comprising an enclosed casing, a bottom for said percolator located a predetermined distance above the bottom edge of the casing, an elongated tubular liquid chamber connected to said bottom for receiving a small amount of liquid, an electric heating element, coils carried by said heating element and arranged in close proximity to a wall of the liquid chamber, a single hand operated fastening member threadedly engaging said stem for holding the heating unit in place relative to the vaporizing chamber whereby removal of said single fastening member permits instant detachability of said heating unit permitting the percolator minus its heating unit to be washed, electric contacts carried by said heating element and arranged inside of the casing, said casing having a single opening through one side thereof, a detachable electric connector extending through said opening and electrically connected with said contacts, and means projecting outwardly from the side of said casing about said opening and providing a support for said connector.

4. A washable electric coffee percolator comprising an enclosed casing, a bottom for said percolator located a predetermined distance above the bottom edge of the casing, an elongated tubular liquid chamber connected to said bottom for receiving a small amount of liquid, an electric heating element, coils carried by said heating element and arranged in close proximity to a wall of the liquid chamber, a removable plate spaced from said bottom and engaging the bottom of the heating element, said plate engaging the inner walls of said casing and having an opening therein, a stem connected to a part of said liquid chamber and extending through the opening in said plate, and a single hand operated fastening member engaging said stem for holding said plate and heating unit in operable position whereby operation of said fastening member releases the heating element to permit instant removal thereof and allowing the percolator to be immersed in water for washing the percolator.

5. A washable electric coffee percolator comprising an enclosed casing, a bottom for said percolator located a predetermined distance above the bottom edge of the casing, an elongated tubular liquid chamber connected to said bottom for receiving a small amount of liquid, an electric heating element, coils carried by said heating element and arranged in close proximity to a wall of the liquid chamber, a removable plate spaced from said bottom and engaging the bottom of the heating element, said plate engaging the inner walls of said casing and having an opening therein, a stem connected to a part of said liquid chamber and extending through the opening in said plate, a single hand operated fastening member engaging said stem for holding said plate and heating unit in operable position whereby operation of said fastening member releases the heating element to permit instant removal thereof and allowing the percolator to be immersed in water for washing the percolator, contact prongs carried by said heating element and arranged inside of said casing, said casing having an opening therein directly opposite said prongs, and an electric connector extending through said opening and removably engaging said prongs for making electric contact therewith.

6. An electric washable coffee percolator comprising an enclosed casing extending from the top to the bottom of the percolator, a bottom for said percolator spaced upwardly a predetermined distance from the bottom edge of the casing, an elongated tubular liquid chamber extending downwardly a predetermined distance from said bottom and connected to said bottom for receiving a relatively small amount of liquid, an electric heating element, coils carried by said heating element and surrounding the outer walls of the liquid chamber to cause instant percolation of the liquid in the chamber without first heating all the liquid in the casing, a removable plate spaced from said bottom and engaging the bottom of the heating element, said plate engaging the inner walls of said casing and having an opening therein, a stem connected to a part of said liquid chamber and extending through the opening in said plate, and a single hand operated fastening member engaging said stem for holding said plate and heating unit in operable position whereby operation of said fastening member releases the heating element to permit instant removal thereof and allowing the percolator to be immersed in water for washing the percolator.

In witness whereof, I have hereunto subscribed my name.

WILLIAM L. KLUG.